United States Patent
Weiss et al.

(10) Patent No.: US 7,945,489 B2
(45) Date of Patent: May 17, 2011

(54) FLEXIBLE COST AND REVENUE ALLOCATION FOR SERVICE ORDERS

(75) Inventors: Klaus D. W. Weiss, Hassloch (DE); Daniel Bock, Heidelberg (DE); Alexander Laufer, Wiesloch (DE); Stefan Walz, Sinzheim (DE)

(73) Assignee: SAP AG, Walldorf (DE)

( * ) Notice: Subject to any disclaimer, the term of this patent is extended or adjusted under 35 U.S.C. 154(b) by 682 days.

(21) Appl. No.: 11/233,384

(22) Filed: Sep. 21, 2005

(65) Prior Publication Data
US 2006/0085302 A1    Apr. 20, 2006

Related U.S. Application Data
(60) Provisional application No. 60/611,973, filed on Sep. 21, 2004.

(51) Int. Cl.
G07B 17/00 (2006.01)
G07F 19/00 (2006.01)
G06Q 10/00 (2006.01)
H04M 15/00 (2006.01)

(52) U.S. Cl. ............... 705/30; 705/1; 705/34

(58) Field of Classification Search ........ 705/30, 705/1, 34
See application file for complete search history.

(56) References Cited

U.S. PATENT DOCUMENTS

| | | | | |
|---|---|---|---|---|
| 4,383,298 A * | 5/1983 | Huff et al. | 705/28 |
| 5,504,674 A * | 4/1996 | Chen et al. | 705/4 |
| 5,657,233 A * | 8/1997 | Cherrington et al. | 705/400 |
| 6,125,354 A * | 9/2000 | MacFarlane et al. | 705/34 |
| 6,311,162 B1 * | 10/2001 | Reichwein et al. | 705/1.1 |
| 6,810,383 B1 * | 10/2004 | Loveland | 705/9 |
| 2001/0053983 A1 * | 12/2001 | Reichwein et al. | 705/1 |
| 2002/0120554 A1 * | 8/2002 | Vega | 705/37 |
| 2002/0138365 A1 * | 9/2002 | Matsubara | 705/26 |
| 2002/0147645 A1 * | 10/2002 | Alao et al. | 705/14 |
| 2002/0188479 A1 * | 12/2002 | Renwick et al. | 705/4 |
| 2003/0023538 A1 * | 1/2003 | Das et al. | 705/37 |
| 2003/0187794 A1 * | 10/2003 | Irwin et al. | 705/40 |
| 2003/0220812 A1 * | 11/2003 | Jones et al. | 705/1 |
| 2005/0238151 A1 * | 10/2005 | Brown et al. | 379/114.01 |
| 2006/0044599 A1 * | 3/2006 | Lipowitz et al. | 358/1.15 |

* cited by examiner

*Primary Examiner* — Matthew S Gart
*Assistant Examiner* — Ig T An
(74) *Attorney, Agent, or Firm* — Fish & Richardson P.C.

(57) ABSTRACT

A method and system handles cost and revenue allocation for service orders. For a service order, there is allowed to be created planned rules for allocation of costs to one or more service providers and for allocation of expected revenues to be received from one or more service receivers, which are forwarded in electronic form, if created, to a cost accounting system. After receipt of a confirmation that the service order has been executed wherein the confirmation includes information about costs actually incurred in executing the service order, there is allowed the creation of revised or newly created rules for allocation of the incurred costs to the one or more service providers and for the allocation of the revenues to be received from the one or more service receivers, which are forwarded in electronic form, if created or revised, to the cost accounting system.

16 Claims, 10 Drawing Sheets

FLEXIBLE COST AND REVENUE ALLOCATION FOR SERVICE ORDERS

CROSS REFERENCE TO RELATED APPLICATION

This application claims the benefit of U.S. Provisional Application No. 60/611,973, filed Sep. 21, 2004, the content of which is hereby incorporated by reference in its entirety.

TECHNICAL FIELD

This document relates to handling cost and revenue allocation for service orders.

BACKGROUND

When a service such as a repair procedure is requested, a service order may be created that identifies the service is to be performed, how the service is to be performed, and who will pay for it. Service orders may be very simple, with a single service provider and a single service item, or service orders may be very complex matters that involve several different service providers who incur costs in providing the service, several different types of services or service items, and several receivers responsible for paying for the service to be performed.

Enterprises that manage the performance of services typically have a computing system to manage the service orders, and in many cases, especially in large enterprises, the computing system to manage service orders may include several separate computing components that all operate in an integrated fashion to manage the entire service order process. One system component may be a cost accounting system in which costs and revenues associated with various service orders may be tracked. In addition, there may be a separate billing computing system that performs the billing function of receiving the information necessary to create a bill for execution of the service order, and creating the bill.

The overall business scenario of a service order may include several processes that are relevant for cost controlling. In a resource planning process, for example, working times, materials, and expenses may be planned for a service order. In general, this process includes planning the costs connected with the service order, and planning the revenues that can be expected. When corresponding service items included in a service order are consumed, users, for example a field service technician, may provide confirmations to report actual usage on these service items.

In some service order scenarios, especially the more complex service scenarios, the value of the entire billing amount may need to be allocated among several different payers and among several different providers of the service. In some cases, the different service providers may be part of the same business enterprise, but a different cost center of the enterprise. In addition, the costs of the service items may need to be allocated to the different service providers involved in executing the service order and who receive payment for the services. Also, the total of the invoiced amount for the service order need not be equal to the confirmed amount of the service order. It may be less or zero if the item cannot be partly or totally billed to a party. Alternatively, the invoiced amount may be more if the same item is billed to more than one party, for example, if the item is billed to a customer and also to an insurance company. In addition, the total of distributed costs need not be equal to the confirmed costs.

In many complex business scenarios, the various allocations may not be known at the outset of a service order. In addition, circumstances that arise during the execution of the service order may cause the allocations to need to be changed. Further yet, different people who use different components of the multiple component computing system may have different information and may be needed to provide input to identify the correct allocation. Having the right allocations determined is very important, because it is needed to make sure invoices are correct and go to the correct payers. In addition, as a cost accounting and controlling matter, determining the correct allocations is also very important so that the costs of the service order are allocated correctly.

SUMMARY

This document discloses a method of handling cost and revenue allocation for service orders. The method includes allowing the creation of, for a service order, planned rules for allocation of costs to one or more service providers and for allocation of expected revenues to be received from one or more service receivers, and forwarding in electronic form the planned allocation rules, if created, to a cost accounting system. The method also includes, after receipt of a confirmation that the service order has been executed wherein the confirmation includes information about costs actually incurred in executing the service order, allowing the creation of revised or newly created rules for allocation of the incurred costs to the one or more service providers and for the allocation of the revenues to be received from the one or more service receivers, and forwarding in electronic form the revised or newly created allocation rules, if created, to the cost accounting system. The method also includes, after a determination has been received in a billing computing system of the revenue amount to be invoiced and its allocation among the one or more service receivers, forwarding in electronic form the invoiced revenue amount and its allocation to the cost accounting system.

In various implementations, the planned rules of allocation include in an electronic service order document that is used in the forwarding in electronic form the planned rules for allocation to a cost accounting system. Also, the cost accounting system, in response to receiving the planned rules of allocation, may calculate preliminary costs. The costs may include overhead costs, and revenue. The cost accounting system may also store in an electronic database the calculated preliminary costs and the calculated revenue per cost element.

The confirmation that the service order has been executed may be provided in an electronic confirmation document that includes the information about the costs actually incurred in executing the service order. In addition, the information about the costs incurred in executing the service order is received by user input to a service execution computing system. Also in this case, the method may also include the service execution computing system allowing a user to create proposed revised rules for allocation of the incurred costs to the one or more service providers, and wherein the proposed revised rules, if created, are included in the electronic confirmation document. The method may also include forwarding the electronic confirmation document to a system that creates an electronic billing request document based on information included in the electronic confirmation document. In this case, the revised rules for allocation of the incurred costs to the one or more service providers and for the allocation of the revenues to be received from the one or more service receivers, if created, may be included in the electronic billing request document. The method may also include receiving, in the billing computing system, the electronic billing request document, and the billing computing system creating an electronic billing document based on the information in the electronic billing request document. The electronic billing document may provide the invoiced revenue amount its allocation that is forwarded to the cost accounting system.

The costs for allocation may include, for example, multiple cost line items. In such a case, the one or more service providers may comprise multiple service providers among which costs are allocated. In some cases, the expected revenues for allocation may include multiple revenue line items of different revenue types. Also, the one or more service receivers may comprise multiple service receivers among which the invoiced revenue amount is allocated.

In another aspect, a computing system is provided for processing service orders. The computing system includes a service order application component that allows the creation of, for a service order, planned rules for allocation of costs to one or more service providers and for allocation of expected revenues to be received from one or more service receivers, and that forwards in electronic form the planned allocation rules, if created, to a cost accounting system. The computing system also includes a service execution application component that, as part of a process of creating a confirmation that the service order has been executed wherein the confirmation includes information about costs actually incurred in executing the service order, allows the creation of revised or newly created rules for allocation of the incurred costs to the one or more service providers and for the allocation of the revenues to be received from the one or more service receivers, and forwarding in electronic form the revised or newly created allocation rules, if created, to the cost accounting system. Finally, the computing system includes a billing computing system that, after a determination has been received of the revenue amount to be invoiced and its allocation among the one or more service receivers, forwards in electronic form the invoiced revenue amount and its allocation to the cost accounting system.

In various implementations, the planned the planned rules of allocation may include an electronic service order document that is used in the forwarding in electronic form the planned rules for allocation to a cost accounting system. The confirmation that the service order has been executed may be provided in an electronic confirmation document that includes the information about the costs actually incurred in executing the service order.

In yet another aspect, a computing system is provided for processing service orders. The computing system includes a service order application component that allows the creation of, for a service order, planned rules for allocation of costs to one or more service providers and for allocation of expected revenues to be received from one or more service receivers, and that forwards in electronic form the planned allocation rules, if created, to a cost accounting system; wherein the service order application component, after receipt of a confirmation that the service order has been executed wherein the confirmation includes information about costs actually incurred in executing the service order, allows the creation of revised or newly created rules for allocation of the incurred costs to the one or more service providers and for the allocation of the revenues to be received from the one or more service receivers, and forwarding in electronic form the revised or newly created allocation rules, if created, to the cost accounting system. The computing system also includes a billing computing component that, after a determination has been received in a billing computing system of the revenue amount to be invoiced and its allocation among the one or more service receivers, forwards in electronic form the invoiced revenue amount and its allocation to the cost accounting system.

In various implementations, the planned rules of allocation may include an electronic service order document that is used in the forwarding in electronic form the planned rules for allocation to a cost accounting system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
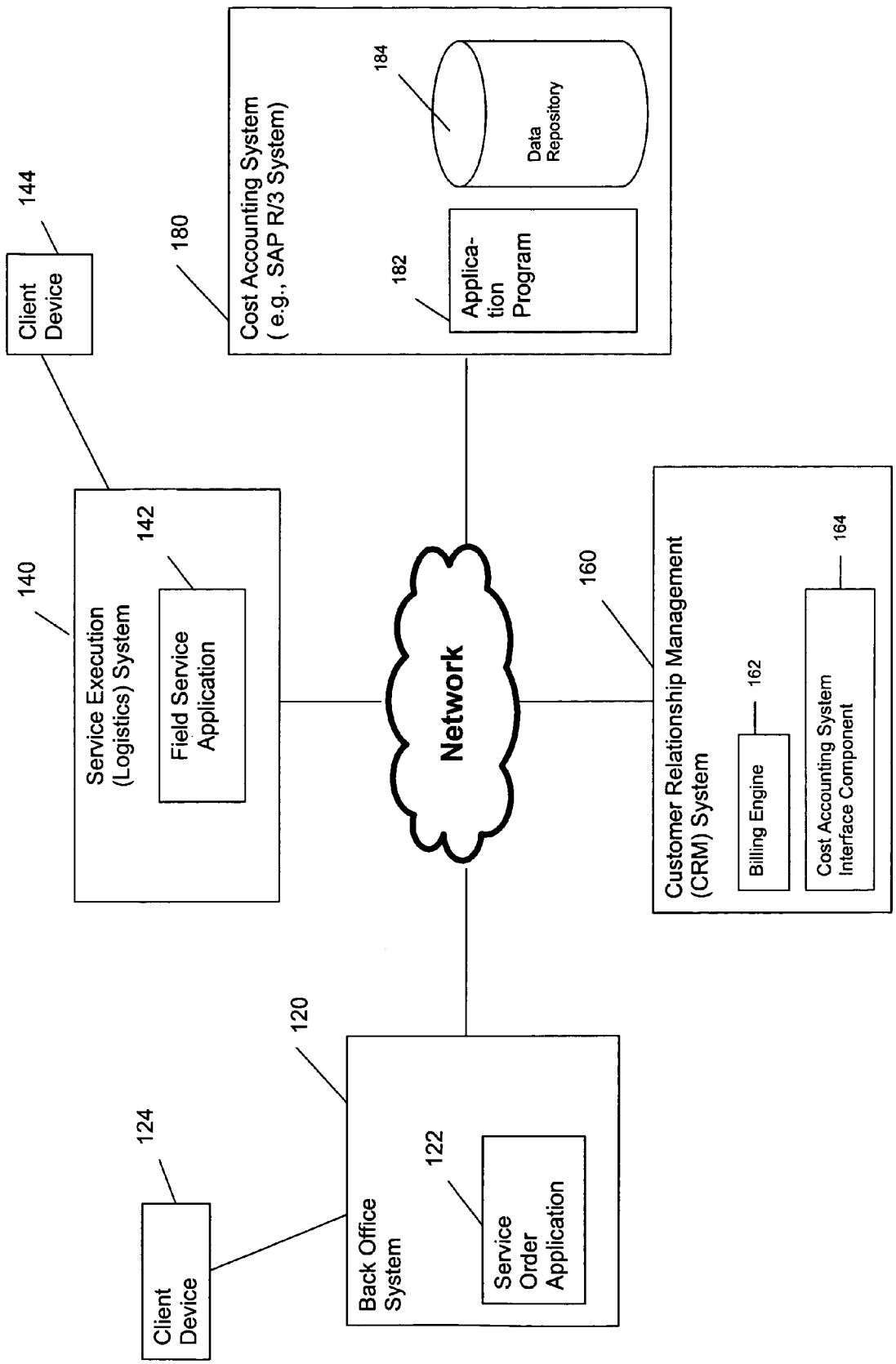
FIG. 1 is a simplified block diagram of an enterprise computing system that perform tasks related to the planning and execution of service orders.

FIG. 1 is a simplified block diagram of an enterprise computing system 100 that includes several server-based applications systems that each have a role in the planning and execution of service orders. In this example, the enterprise computing system includes a back office system 120, a service execution system 140, a customer relationship management (CRM) system 160, and a cost accounting system 180.

Each of the systems 120, 140, 160 and 180 may be server-based computing systems that each execute different software applications that collectively perform an integrated business process. In addition, each of the systems may reside on multiple servers; in addition, more than one of the systems may reside on a single server. The systems include various software applications or programs 122, 142, 162, 164 and 182 that are made up of executable software program instructions executed by respective processors. The example configuration shown in FIG. 1 is intended for illustrative purposes only, and is not intended to dictate a particular physical configuration for the system 100.

The back office system 120 includes a service order software application 120 that enables a service order to be planned, and from which execution and control of the service order is conducted. A user may interact with the back office system 120 and the service order application 122 using client device 124.

Examples of service orders include orders that may involve multiple service items provided by one or more service providers, and may involve services that are provided for the benefit of one or more service receivers. The service providers incur costs in providing their service items, and as such are typically owed payment (revenues) from the service receivers. Some service orders may be very large and expensive tasks, and may involve many service providers and service receivers. For example, the service order may be to attend to a broken-down engine in an industrial machine. In such an example, there may be several entities who will need to pay for the service, and thus will be referred to as the service receivers. For example, there may be a dealer of the industrial machine who sold the machine to the end user, an insurance company who may be liable for catastrophic failures of the machine, and a customer or end user of the machine. In addition, there may be internal service receivers as well as external service receivers. For example, if the enterprise is required by contract, for example, to bear the costs of certain services it performs, it may be a service receiver. In some cases, payment for execution of the service order may be allocated among these various service receivers, and the allocation may not be determinable until the service order has been executed.

In addition, some service orders involve various service items required to execute the entire service order. The providers who supply the service items may be referred to as service providers. There may be one or more service providers who provide all of the service items need to execute a service order. In addition, different service providers may be a part of the same organization, but a different cost center of the organization. In the machine repair example referred to previously, service items may include, for example, labor components that are billed by the hour, the use of repair machinery that may also be billed by the hour, replacement parts used in the repair, etc. Ideally, each of these service items will be allocated a cost, and the service provider who provided the service item will be allocated a portion of the total revenue received from all of the service receivers for execution of the entire service order.

The service execution system 140 is a system in which a user such as field service personnel responsible for executing the service order may interact with the system. The service execution system 140 in this example includes a field service software application 142 that is executed by the service execution system 140. A user such as the field service personnel may interact with the system 140 using client device 144. The field service personnel may, for example, input to the system 140 a confirmation a service order has been completed. In addition, the field service personnel may input into the system actual costs incurred in executing the service order, and may also revise allocations of costs among cost items as will be described in more detail later.

The customer relationship management (CRM) system 160 is a general term for a system that manages interactions that take place between the enterprise and its customers. The CRM system 160 may include various marketing, sales and other functionality, but for present purposes the relevant components of the CRM system 160 are firstly a billing software engine 162 that prepares billing invoices to customers for services rendered, for example, for the execution of a service order. Secondly, the CRM system 160 also includes a cost accounting system interface software component 164 that serves to transfer information needed by the cost accounting system 180. This component 164, in some embodiments, is not included in the CRM system 160. However, inclusion of the cost accounting system interface component 164 in the CRM system 160 may be an appropriate place for such a component because, as will be described later, the information to be transferred is firstly being transferred to the CRM system's billing engine 162.

The final component of the system 100 shown in FIG. 1 is the cost accounting system 180. In one example, the cost accounting system may be a component of an R/3 system provided by SAP A.G. of Walldorf, Germany, and in particular a cost accounting component named "FI/CO" of the R/3 system. The cost accounting system 180 performs various cost accounting functions, such as cost controlling and other functions that will be described in more detail later. To perform these functions, the cost accounting system 180 includes an application program 182. The cost accounting system 180 also includes a data repository 184 in which cost and revenue data are stored.

Figure 2:
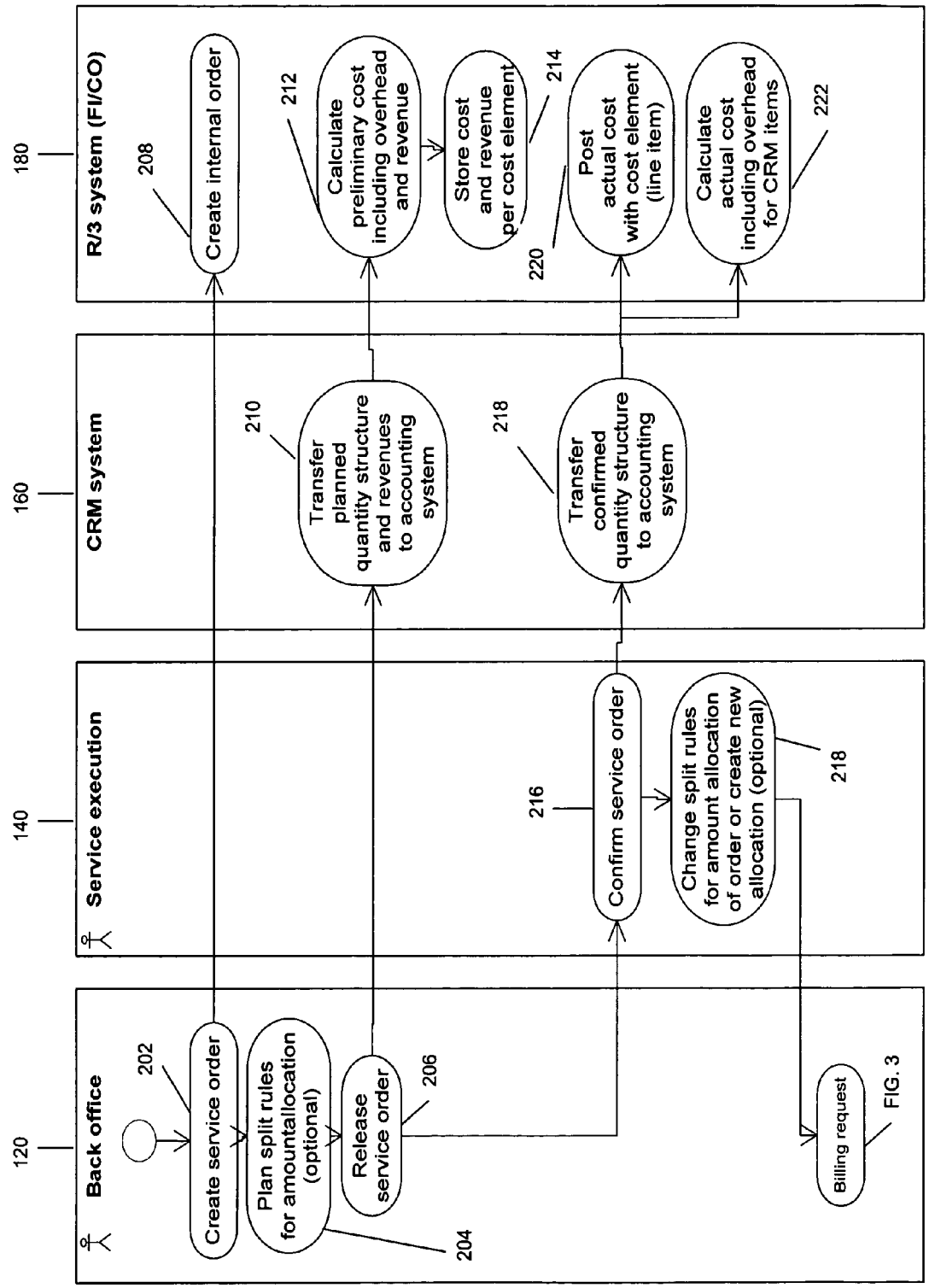
FIGS. 2-4 are flow diagrams that show example processes performed by the system components of FIG. 1.
Figure 3:
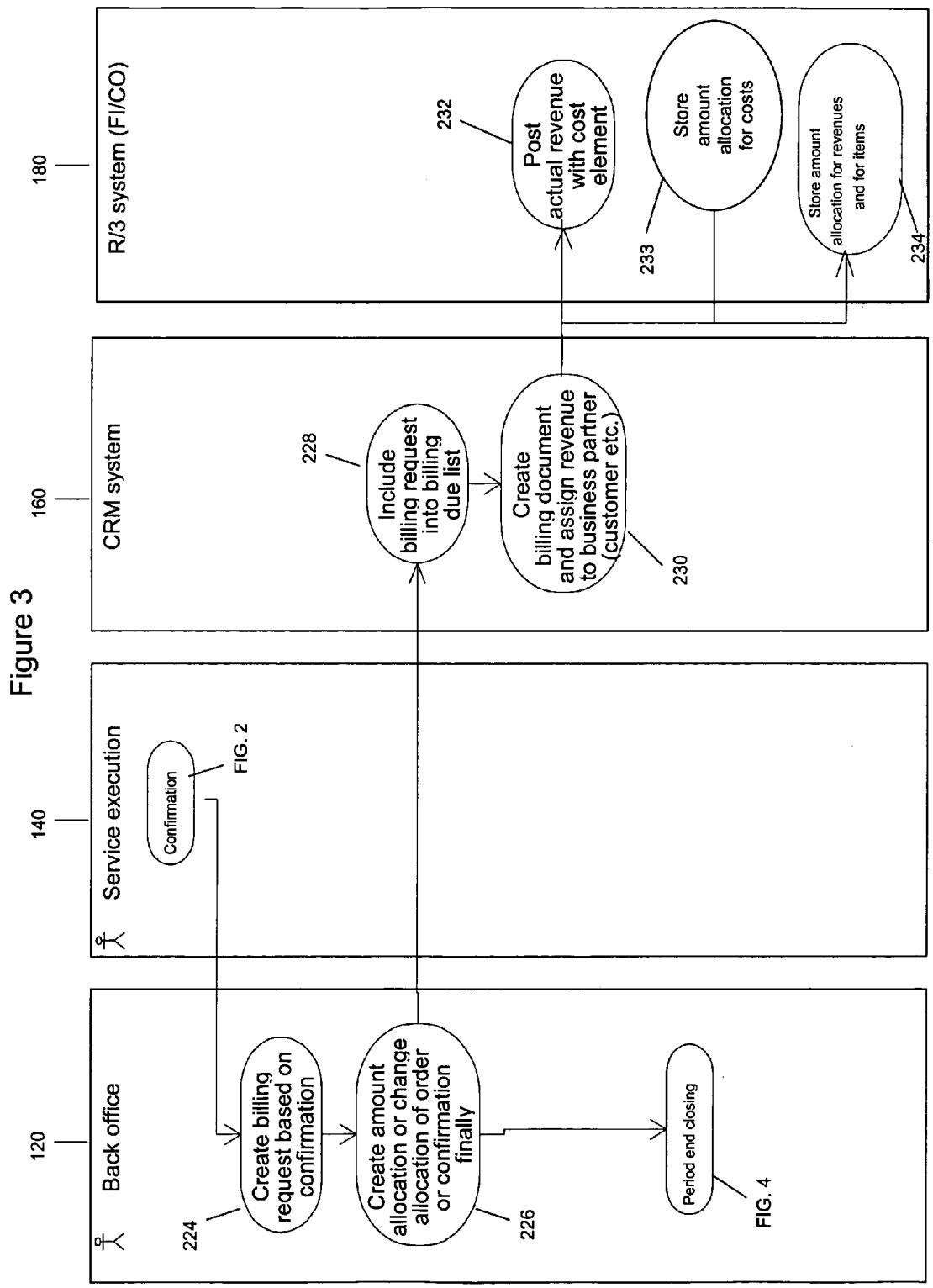
Figure 4:
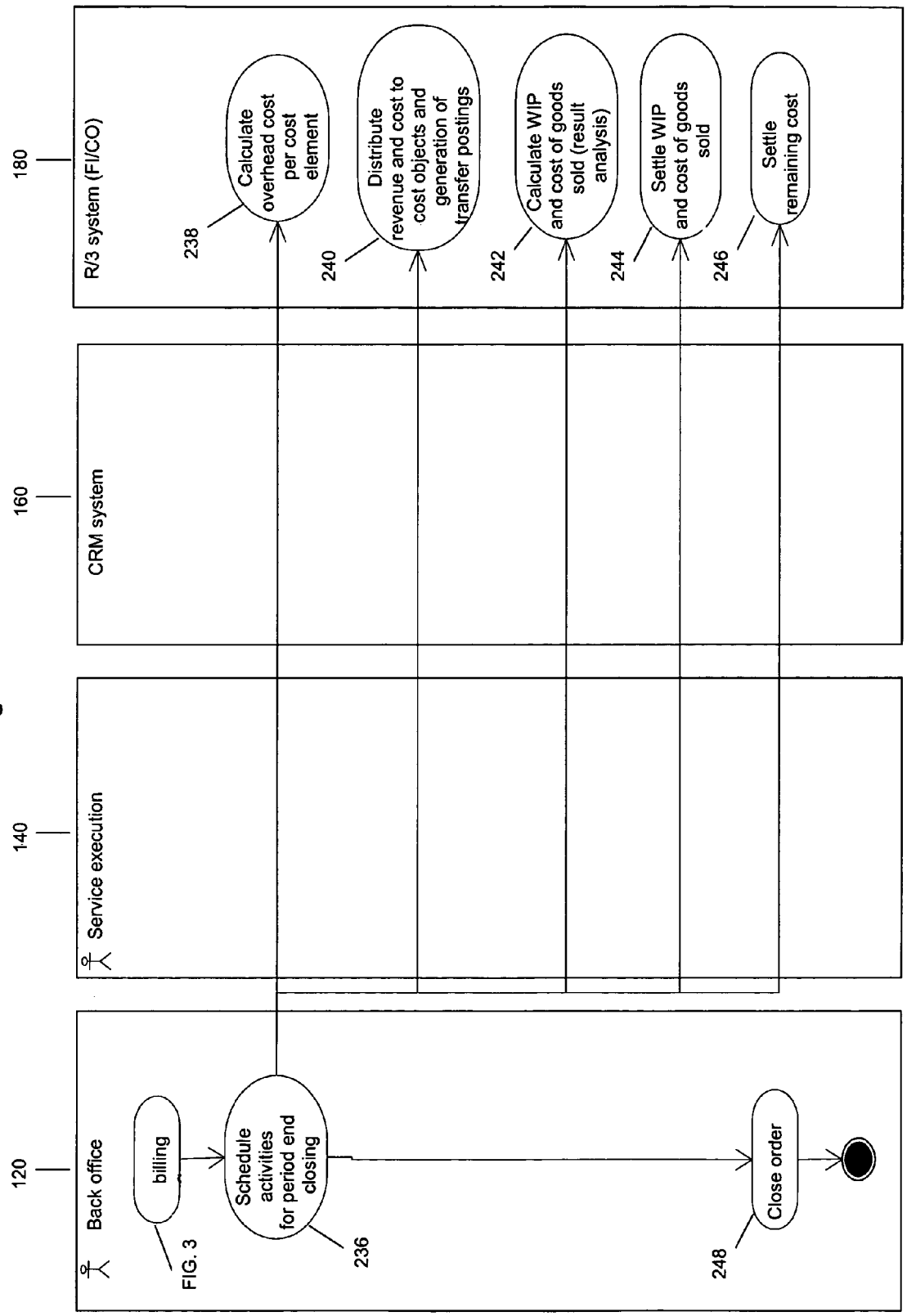

Referring now to FIGS. 2-4, flow diagrams are shown of processes that may be executed by the system components shown in FIG. 1, namely, by the back office system 120, the service execution system 140, the CRM system 160, and the cost accounting system 180. Generally, the processes shown in FIGS. 2-4 provide for flexibility in the allocation of cost items and revenues (payments for the services) to the various service providers and service receivers.

Beginning with step 202, a service order is created in the back office system 120 under control of the service order application 122. The service order may be created by a user inputting information to create the service order using client device 124. The service order may be an electronic document that contains all necessary information making up the service order, for example, the customer requesting the service order, the problem to be addressed, etc. The service order electronic document, in one example, is an extensible mark-up language (XML) document which is a useful format when information needs to be passed from one system to another.

At step 204, split rules for an amount allocation can optionally be made. For example, payment for execution of the service order may be allocated between two service receivers, such as a customer or user of industrial machinery and an insurer of the machinery. For example, the rule may be that 60 percent of the charges are to be paid by the customer and the remaining 40 percent by the insurer. In some cases, the need for an allocation may not yet be known, and will only be known once the service order is executed. For example, it may not be known at the outset whether the problem being addressed by the service order falls within the insurance coverage.

As with the creation of the service order, the amount allocation at step 204 may similarly be made by a user inputting information to create the service order using client device 124. The amount allocation may be included in the electronic service order document or a separate electronic document. After the amount allocation is performed, if it is performed, at step 206 the back office system 120 releases the service order, which causes the electronic service order document, including the amount allocations if any, to be forwarded by the back office system 120 to the service execution system 140.

The creation of the electronic service order document in step 202 also causes, at step 208, the creation of an internal order in the cost accounting system 180. The internal order may be an electronic document that is used by the cost accounting system 180 to track costs and revenues for the service order. The internal order may be, for example, a database object used in the SAP A.G. R/3 system previously discussed. In addition, in other implementations, the internal order may in general be any cost collector tool, and in addition, in other implementations the order need not be an internal order. In addition to the service order document being forwarded to the service execution system 140, the service order document is also forwarded by the back office system 120 to the CRM system, which in turn, at step 210, transfers the planned quantity structure and revenues included in the service order document to the cost accounting system 180. In one example, this information may be forwarded from the back office system to the CRM system 160 and in turn the cost accounting system 180 by forwarding the service order document that includes the needed information.

In response to receiving the planned quantity structure and revenues from the CRM system 160, the cost accounting system at step 212 calculates preliminary costs (including overhead that may not be mentioned in the service order document) and revenue for each cost item. That calculated information, at step 214, is stored by the cost accounting system 180, for example, in data repository 184.

After the service order has been executed in the field, for example a broken-down machine has been repaired, a confirmation that the service order has been executed is created in the service execution system at step 216. This confirmation may be created by a user interacting with client device 144 and entering information indicating that the job has been completed. In addition, as part of that process, the quantity structure actually used in executing the service order, which may differ from the planned quantity structure, may be entered via client device 144 by the user and included in the confirmation. As with the service order, the confirmation may comprise an electronic document, such as an XML document. The confirmation is forwarded to the CRM system 160, which in turn transfers, at step 218, the confirmed quantity structure to the cost accounting system 180. In response to receiving that information, the cost accounting system 180 posts, at step 220, the actual cost with the applicable cost element previously stored in the at step 214. Costs from service confirmations are posted to a cost collector (internal order), and are stored additionally in a data repository 184, as will be further shown later in FIG. 6. The storing of information in the data repository 184 is made in proper relation to the information previously stored there in step 214. In addition, the cost accounting system 180 calculates, at step 222, actual costs including overhead for CRM items, which includes items such as other customer assistance not previously anticipated and included in the original cost items.

After confirmation of the service order at step 216, the split rules for amount allocation, at step 218, may be changed using the service execution system 140 from the allocations previously made using the back office system 120 at step 204. Alternatively, if the allocations were not previously made using the back office system 120 at step 204, new split rules for amount allocations may be created in the service execution system 140 at step 218. In either case, the split rules may be made or changed by a user inputting information into the service execution system 140 using client device 144. The split rules may be included in the electronic confirmation document created at step 216. From step 218, the process flow continues to the billing request functions shown on the next figure, FIG. 3.

Referring now to FIG. 3, the confirmation document in this case is forwarded by the service execution system 140 to the back office system 120 to create a billing request at step 224. The back office system 120, in response to receiving the confirmation document from the service execution system 140, creates, at step 224, a billing request based on the information in the confirmation document. The billing request like other information discussed previously may also be an electronic document such as an XML document. In addition, it is also possible, at step 226, to create or change the amount allocation using the back office system 120. As such, in addition to field service personnel being able to input amount allocations in the field using via the service execution system 140, back office personnel who may have available different information may also create or change the amount allocation. The amount allocation, as changed or created in step 226, may in one implementation be included in the electronic billing request document.

The electronic billing request document is then forwarded by the back office system 120 to the CRM system 160. The CRM system 160, at step 228, includes the billing request at the appropriate time into a billing due list. For example, it may be that bills only go out at a certain time every month, instead of when the job is complete, and thus the billing request may not be entered into the billing due list until the date the bill is to be processed. At step 230, a billing document is created in the CRM system 160, and the CRM system 160 also assigns revenue to various service receivers, referred to generally in FIG. 3 as business partners, for example, customers, etc. The revenue assignments may also be included in the billing document that is created. Following the creation of the billing document and assigning of revenue in step 230, actual revenue information is transferred from the CRM system 160 to the cost accounting system, and at step 232 the actual revenue is posted with the applicable cost element. In addition, the amount allocation for costs are transferred from the CRM system 160 to the cost accounting system 180, and that information is stored for the applicable items at step 233. In addition, the amount allocation for the revenues is also transferred from the CRM system 160 to the cost accounting system 180, and that information is stored for the applicable items at step 234. The storage of the information in steps 232, 233 and 234 may be done, for example, in the data repository 184.

Referring now to FIG. 4, processes that are executed upon period end closing, for example, when accounting reporting must be performed, are shown. At step 236, the back office system 120 schedules at the appropriate time activities to be performed at period end closing. Information is then sent, via messages for example, from the back office system 120 to the cost accounting system 180. In response, the cost accounting system 180 performs the following tasks: calculates at step 238 overhead cost for each cost element; at step 240 distributes revenue and cost to cost items and generates transfer postings; calculates at step 242 work-in-process (WIP) and cost of goods sold (result analysis); settles at step 244 WIP and cost of goods sold; and settles at step 246 remaining cost. Back in the back office system 120 at step 248, which occurs after the activities for period end closing were scheduled in step 236, the back office system 120 closes out the service order from its system as all tasks are now complete with respect to the service order.

Having now described the processes outlined in FIGS. 2-4, some further notes of the processes deserve noting. The split rules of the amount allocation may be entered into the service order if the external and internal receivers are known at the point in time. They may be copied to each service confirmation which may be a follow-up of the order. The split rules may be changed or newly created on the confirmation. They may be defined at this point for unplanned items the first time. The split rules may be copied to billing request which is a follow-up of the confirmation. They can be changed or newly created on the billing request. This is the final form of the split rules which is eventually used for the allocation of revenues and costs.

Actual costs in the processes described in FIGS. 2-4 are stored twice. First, they are stored per cost element on a cost object, for example an internal order, in the cost accounting system. Second, they are stored per CRM confirmation referring the service order item in a new table.

If all quantities and values are posted to the internal orders triggered by the service confirmation, all of the costs on the internal order may be distributed and the balance will be zero. However, if costs are directly booked to the internal order in the cost accounting system, they will in most cases not be assigned to CRM items and distributed according to amount allocation. In such a case, an order settlement may be executed.

Figure 5:
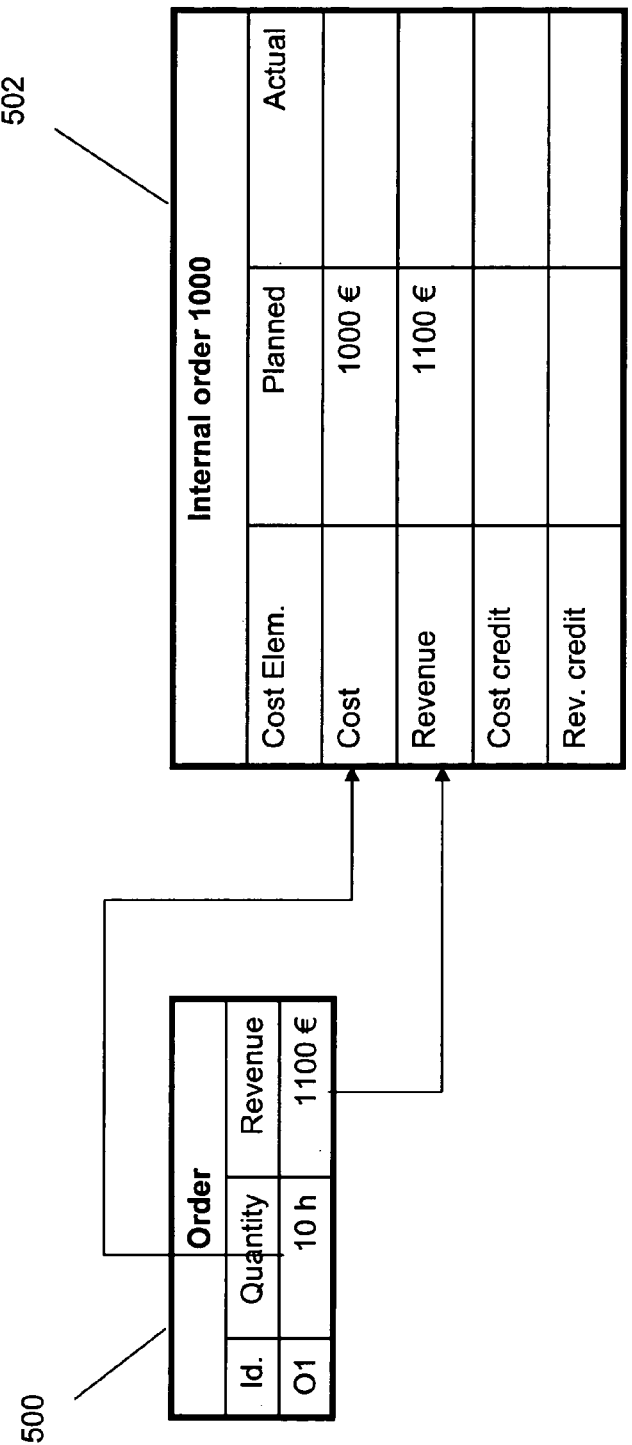
FIGS. 5-10 are example tables and values that may be created during execution of the processes shown in FIGS. 2-4.

Referring now to FIGS. 5-10, example data structures and an example value flow are shown for a service product. In FIG. 5, the value flow for order creation is shown. In particular, a service order document 500 is shown that may be created at step 202 (FIG. 2). The service order document 500 has a document identification of "O1." The sales price for this service order is 1100 Euro per hour, and the cost is 100 Euro per hour. The planned quantity as shown in the service order document 500 is 10 hours. Also shown in FIG. 5 is an example internal order document (number 1000) 502 created at step 208 (FIG. 2) in the cost accounting system 180. As shown in the internal order document 502, the planned cost is 1000 Euro and the planned revenue is 1100 Euro.

Figure 6:
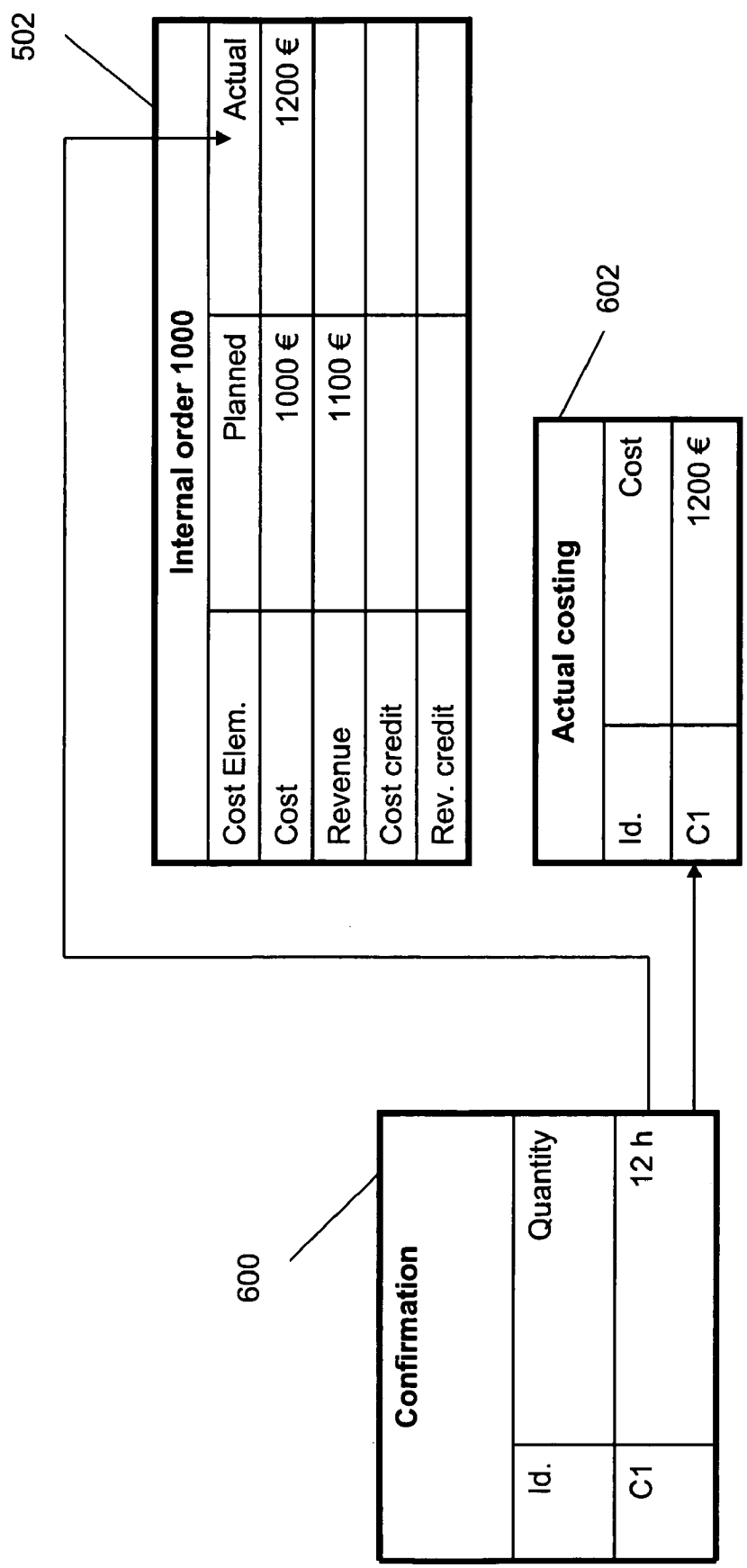

Referring now to FIG. 6, the value flow for confirmation is shown. Completion of execution of the service order leads to the creation, at step 216, of the confirmation document 600 (FIG. 6), which has a document identification of "C1." As shown in the confirmation document 600, the actual quantity of hours needed to execute the service order was 12 hours, instead of the planned 10 hours. The actual cost of 1200 Euro is posted, in accordance with step 220 (FIG. 2) to the internal order document 502 (see FIG. 6). Example actual costing information created in step 222 (FIG. 2) is shown in the actual costing document 602 shown in FIG. 6.

Figure 7:
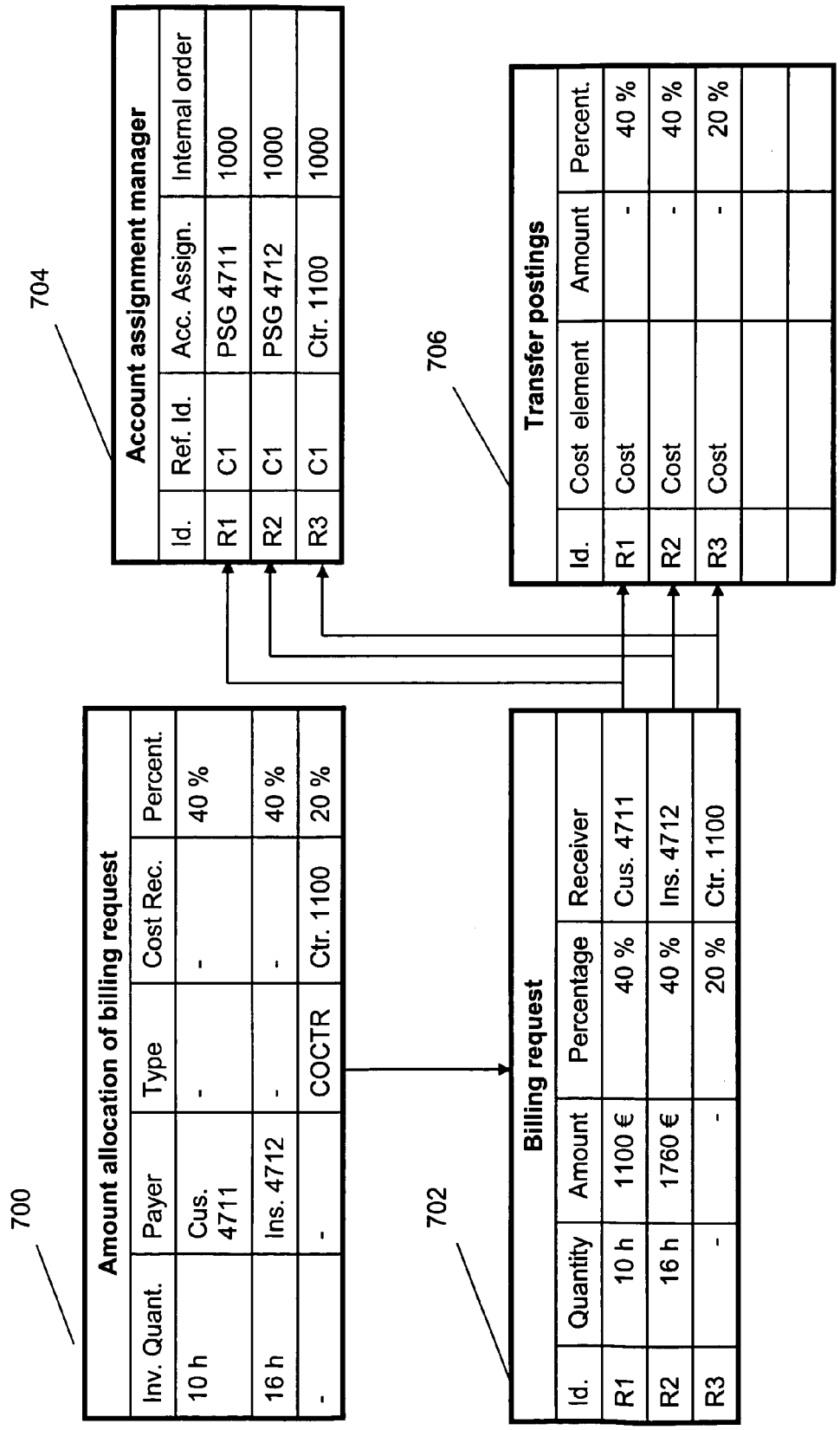

In FIG. 7, a value flow for the billing request is shown. An example amount allocation as included in the billing request (created at step 224 of FIG. 3) is shown in the amount allocation document 700. As discussed previously, the amount allocation may be created and revised at various points in the process, including after the billing document has been created. In the FIG. 7 example, the service is to be billed to more than one payer, and the costs are assigned to three parties including customer number 4711, insurer number 4712, and an internal cost center 1100. In this example, the invoiced quantity is larger than the confirmed quantity.

In the example, only 12 hours were confirmed by the technician and 10 hours are billed to the customer. As such, two hours are not billed to the customer, and thus the service is in goodwill, rendered free of charge. In addition, 16 hours are billed to the insurance, for example, as it is known that the insurance is obligated to pay that amount. The assignment of the costs (in this example) is independent from the billing. Forty percent of the costs (480 Euro) are assigned to the customer, forty percent (480 Euro) are assigned to the customer, and only twenty percent (240 Euro) are assigned to the cost center. A possible reason for assigning costs to the cost center could be that this cost center is responsible for the fact that two hours cannot be billed to the customer and were rendered free of charge. The example here is intended to express the flexibility of amount allocation.

The amount allocation for the costs may be stored in the cost accounting system 180 in a transfer posting work list when the billing request has been completed. The term transfer posting work list, instead of transfer posting document, is used because a transfer posting document is the document that is created when the transfer posting is carried out. But in this example, a work list provides the information on the transfer postings that will be carried out as part of a period-end closing process. The account assignment manager 704 may be used, which may be used to administer the references between the CRM documents and the cost accounting system account assignments.

A billing request document in the form of document 702 may be forwarded from the back office system 120 to the CRM system 160 for the creation of a billing document in step 230 (FIG. 3). In this example, the billing request document 702 is created based on the amount allocation. In a transfer postings document (would not use that term, see above) 706, shown in FIGS. 7 and 8, the information stored posted and stored in steps 232 and 234 (FIG. 3) is shown.

Figure 8:
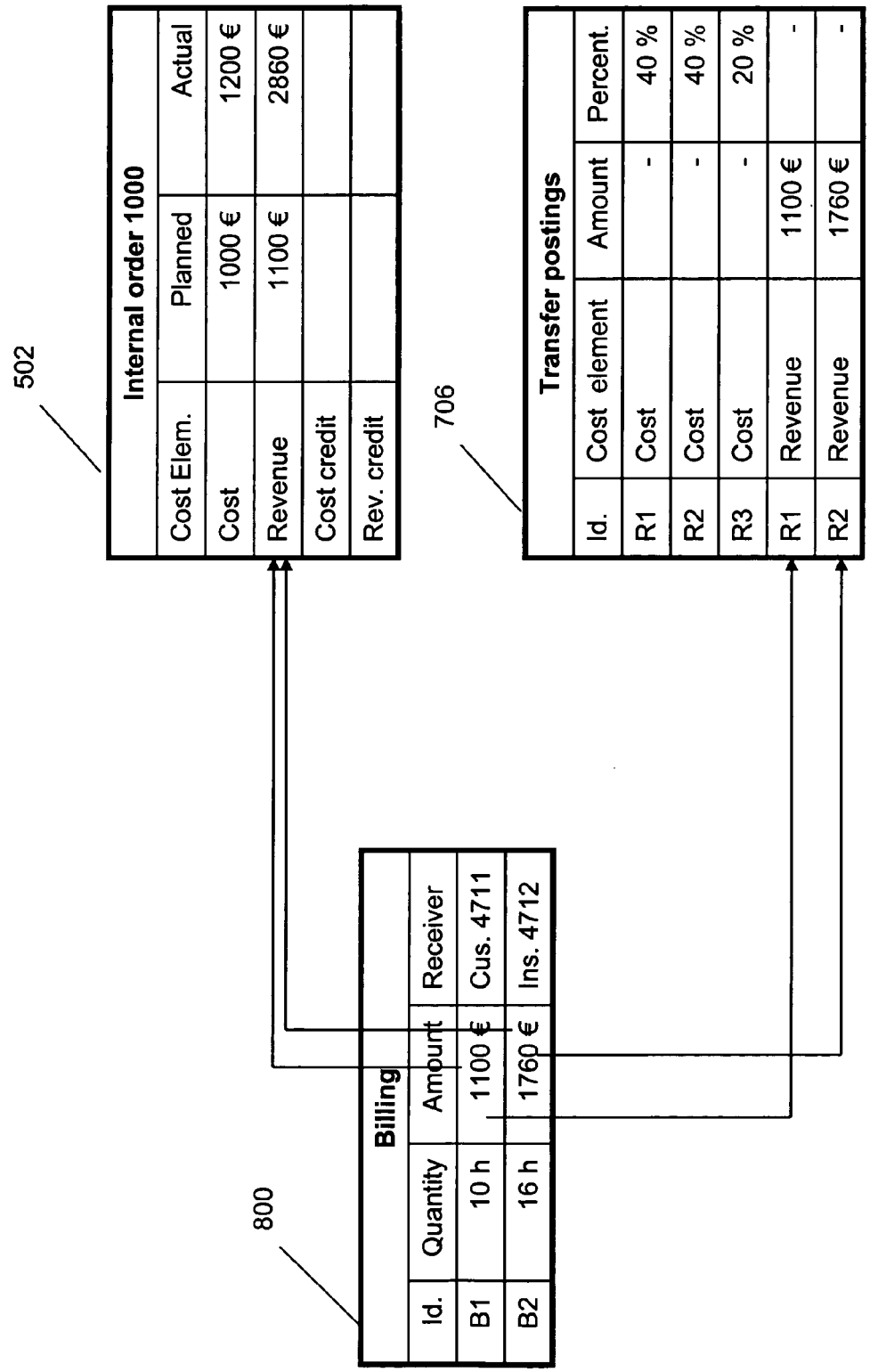

FIG. 8 shows a value flow for billing. In particular, FIG. 8 shows an example billing document 800 that may be created at step 230 (FIG. 3). Revenue from the billing document 800 is stored in the internal order document 502, as shown, as well as in the transfer postings document 706, as shown.

Figure 9:
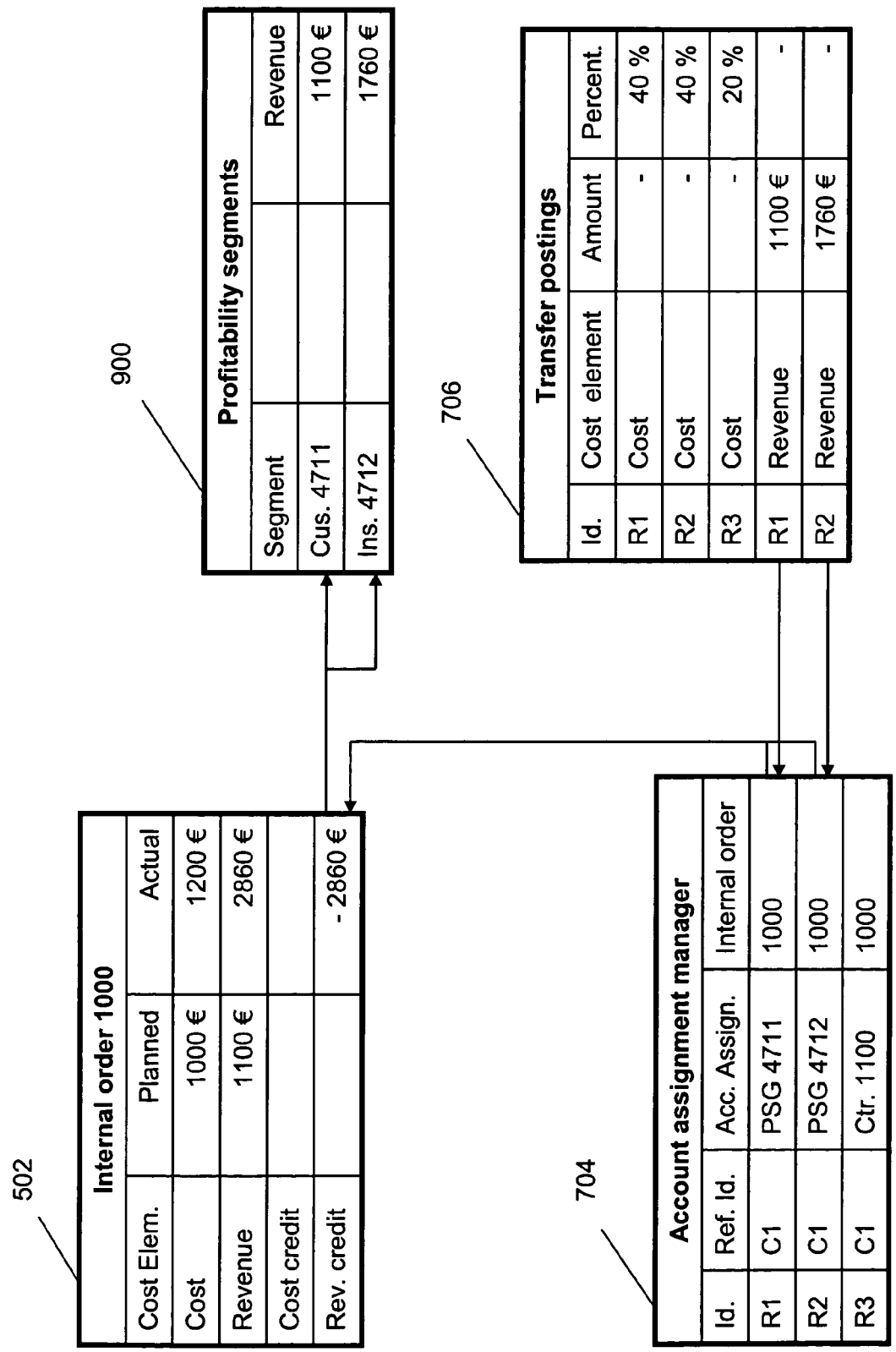

FIG. 9 shows the value flow of the revenues during the transfer posting process which transfers the revenue from the internal order to the final receivers (profitability segments 900). The information on the amounts is taken from the transfer posting work list 706, and the information on the account assignments is taken from the account assignment manager 704. According to the amount allocation, 1100 Euro are transferred to the profitability segment customer and 1760 Euro are transferred to the profitability segment insurance.

Figure 10:
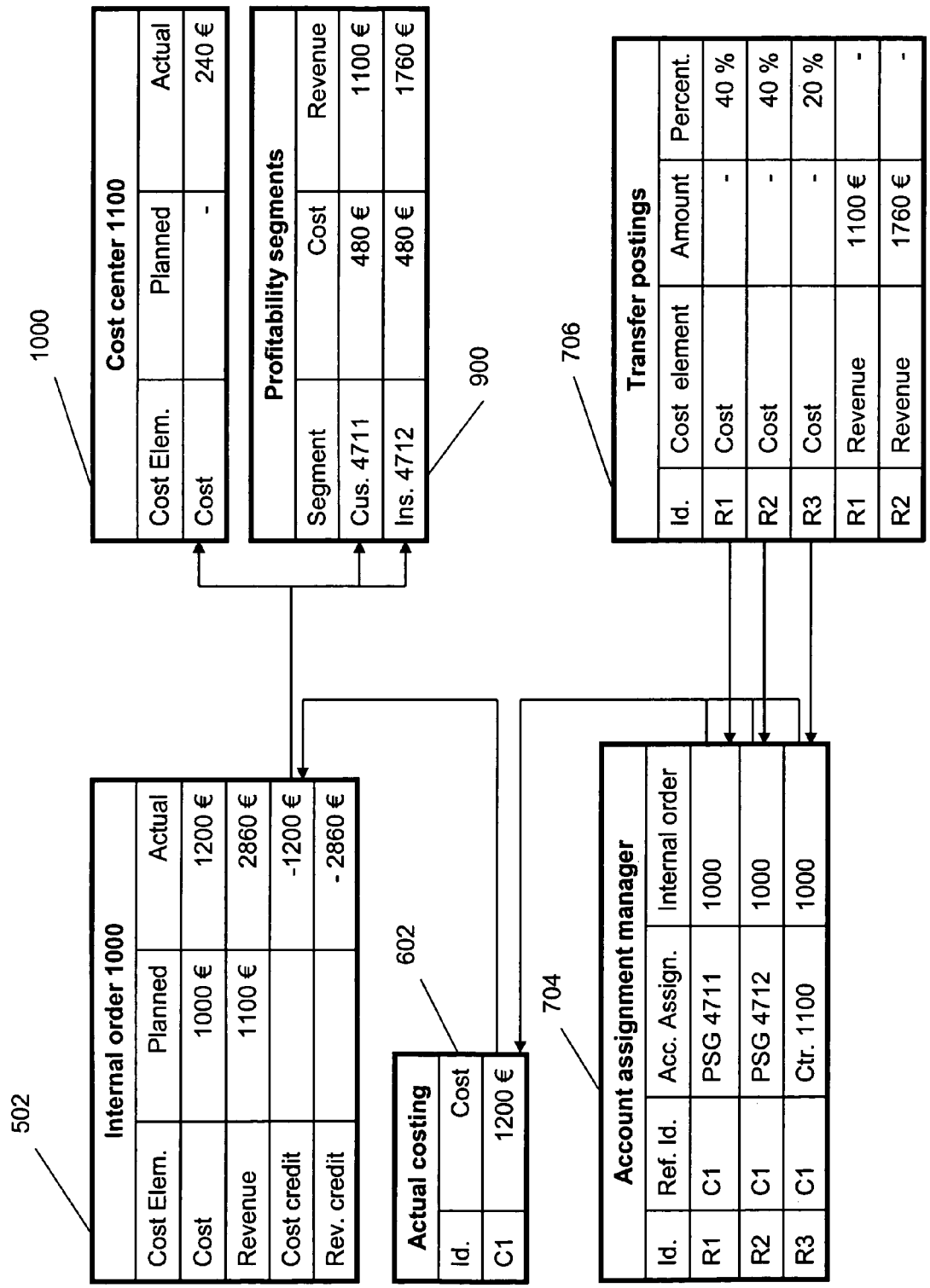

FIG. 10 shows the value flow of the costs during the transfer posting process which transfers the costs from the internal order to the final receivers (profitability segments, cost center). The information on the amount of costs that have to be transferred is calculated from the percentages that are stored in the transfer posting work list 706 and the actual costs 602 which were stored with the service confirmation. The information on the account assignments and references is taken from the account assignment manager 704. According to the amount allocation 480 Euro have to be transferred from the internal order to the profitability segment insurance as well as to the profitability segment customer and 280 Euro have to be transferred to the cost center.

In the flexible revenue and cost allocation of resource consumption scenario, resources, which are planned and consumed in logistics, are automatically transferred to the enterprise resource planning system where the controlling information (quantities, working times, costs, revenues etc.) are stored on the database. When the amount allocation is completed in logistics, the corresponding account assignments and the information on the costs which are debt to the different receivers is transferred to the cost account system. Here, this information is stored on the database as well. These data are completed by the information on the revenues at the time of billing.

Costs and revenues are transferred to the final receivers by postings. For these postings, particular cost elements can be defined. These postings can either be carried out transaction based or as part of the period-end-close activities. Costs and revenues, which have been assigned to a certain receiver, are posted at the same point in time. If there are no revenues, expected costs can be posted independently and vice versa.

The flexible revenue and cost allocation of resource consumption scenario can also be carried by using a cost collector in the enterprise resource planning system, where the cost collector serves as the internal order. In this scenario, for each logistical process, a cost collector may be generated in cost accounting of the enterprise resource planning system. Controlling information which is transferred to the enterprise resource planning system is stored on the database and updated simultaneously on the cost collector. The transfer of costs and revenues to the final receivers takes place in form of transfer postings. The cost collector can be used for monitoring the value flow of the entire logistical process.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of handling revenue allocation for service orders, the method comprising:

identifying a first group of multiple different service receivers that are projected to be responsible to pay for projected services as part of a service order;

creating, in a service order application computer system, (i) an electronic record for the service order in which the identified first group of multiple different service receivers are projected to be responsible to pay for projected services as part of the service order and (ii) planned allocation rules for allocation of expected revenues to be received as payment for the projected services from each service receiver of the first group of multiple different service receivers, and forwarding in electronic form the planned allocation rules to a cost accounting system;

after receipt of an electronic confirmation in a service execution computer system that the service order has been executed, determining a second group of multiple different service receivers that are each responsible for at least a portion of actual services performed as part of the service order being executed, wherein the first group of service receivers differs from the second group of service receivers in that (i) one or more projected service receivers of the first group is not an actual service receiver in the second group, or (ii) one or more actual service receivers in the second group is not a projected service receiver in the first group;

receiving user input at the service execution computer system, the received user input defining second allocation rules for an allocation of revenues to be received as payment for the actual services performed as part of the service order from each actual service receiver of the second group of multiple different service receivers, the second allocation rules comprising either revisions to the planned allocation rules or newly created allocation rules, and forwarding in electronic form the second allocation rules to the cost accounting system;

creating an electronic billing request document that identifies an amount due as payment for the actual services under the service order by each of the actual service receivers of the second group of multiple different service receivers, the creation of the electronic billing request document comprising determining allocation of an overall revenue amount among the actual service receivers of the second group of multiple different service receivers based on the second allocation rules; and forwarding to the cost accounting system in electronic form the overall revenue amount and the determined allocation of the overall revenue amount among the second group of multiple different service receivers.

2. The method of claim 1, wherein the planned allocation rules are included in the electronic service order record, and wherein the electronic service order record with the planned allocation rules is forwarded to the cost accounting system.

3. The method of claim 1, wherein the cost accounting system in response to receiving the planned allocation rules calculates preliminary costs, the costs including overhead costs, and revenue, and stores in an electronic database the calculated preliminary costs and the calculated revenue per cost element.

4. The method of claim 1, wherein the electronic confirmation that the service order has been executed is provided in an electronic confirmation document that includes the information about costs actually incurred in executing the service order.

5. The method of claim 4, wherein the information about the costs incurred in executing the service order is received by user input to the service execution computer system.

6. The method of claim 5, wherein the method further comprises forwarding the electronic confirmation document to a computer system that creates the electronic billing request document based on information included in the electronic confirmation document.

7. The method of claim 6, wherein the second allocation rules are included in the electronic billing request document.

8. The method of claim 7, wherein the method further comprises receiving, in a billing computing system, the electronic billing request document so that a bill to the second group of multiple different service receivers can be prepared.

9. The method of claim 8, wherein the method further comprises the billing computing system creating an electronic billing document based on information in the electronic billing request document.

10. The method of claim 9, wherein the electronic billing document provides an invoiced revenue amount and its allocation, and is forwarded to the cost accounting system.

11. The method of claim 1, wherein in the expected revenues for allocation include multiple revenue line items of different revenue types.

12. A computing system for processing service orders, the computing system comprising:

a service order application component configured to identify a first group of multiple different service receivers that are projected to be responsible to pay for projected services as part of a service order, wherein the service order application component is further configured to create (i) an electronic service order record for the service order for which services have not yet been provided and for which the identified first group of multiple different service receivers are projected to be responsible to pay for projected services as part of the service order, and (ii) planned allocation rules for allocation of expected revenues to be received as payment for the projected services from each service receiver of the first group of multiple different service receivers, wherein the service order application component is further configured to forward in electronic form the planned allocation rules to a cost accounting system;

a service execution application component configured to determine, upon completion of services under the service order as indicated by a user entry, a second group of multiple different service receivers that are each responsible for at least a portion of actual services performed as part of the service order being executed, wherein the first group of service receivers differs from the second group of service receivers in that (i) one or more projected service receivers of the first group is not an actual service receiver in the second group, or (ii) one or more actual service receivers in the second group is not a projected service receiver in the first group, wherein the service execution application component is further configured to create an electronic confirmation that the service order has been executed, wherein the electronic confirmation includes information about costs actually incurred in executing the service order, and includes user defined second allocation rules for the allocation of revenues to be received as payment for the actual services performed as part of the service order from each of the actual service receivers of the second group of multiple different service receivers, the second allocation rules comprising either revisions to the planned allocation rules or newly created allocation rules, wherein the service execution application component is further configured to forward in electronic form the second allocation rules to the cost accounting system; and a billing computing system configured to determine allocation of an overall revenue amount among the actual service receivers of the second group of multiple different service receivers based on the second allocation rules, and configured to forward to the cost accounting system in electronic form the overall revenue amount and the determined allocation among the multiple different service receivers.

13. The computing system of claim 12, wherein the planned allocation rules are included in the electronic service order record, which is used in the forwarding in electronic form the planned allocation rules to the cost accounting system.

14. The computing system of claim 12, wherein the confirmation that the service order has been executed is provided in an electronic confirmation document that includes the information about the costs actually incurred in executing the service order.

15. A computing system for processing service orders, the computing system comprising:

a service order application component configured to identify a first group of multiple different service receivers that are projected to be responsible to pay for projected services as part of a service order, wherein the service order application component is further configured to create (i) an electronic service order record for the service order for which services have not yet been provided and for which the identified first group of multiple different services receivers are projected to be responsible to pay for projected services as part of the service order, and (ii) planned allocation rules for allocation of expected revenues to be received as payment for the projected services from each service receiver of the first group of multiple different service receivers, the service order application component being further configured to forward in electronic form the planned allocation rules to a cost accounting system, the service order application component being further configured to, after receipt of an electronic confirmation that the service order has been executed, determine a second group of multiple different service receivers that are each responsible for at least a portion of actual services performed as part of the service order being executed, wherein the first group of service receivers differs from the second group of service receivers in that (i) one or more projected service receivers of the first group is not an actual service receiver in the second group, or (ii) one or more actual service receivers in the second group is not a projected service receiver in the first group, wherein the service order application component is further configured to create second allocation rules and wherein the electronic confirmation includes information about costs actually incurred in executing the service order, the second allocation rules for the allocation of revenues to be received as payment for the actual services performed as part of the service order from each of the actual service receivers of the second group of multiple different service receivers, the second allocation rules comprising either revisions to the planned allocation rules or newly created allocation rules, wherein the service order application component is further configured to forward in electronic form the second allocation rules to the cost accounting system; and a billing computing component configured to determine allocation of an overall revenue amount among the actual service receivers of the second group of multiple different service receivers based on the second allocation rules, and configured to forward to the cost accounting system in electronic form the overall revenue amount and the determined allocation among the multiple different service receivers.

16. The computing system of claim 15, wherein the planned allocation rules are included in the electronic service order record that is used in the forwarding in electronic form the planned allocation rules to the cost accounting system.

* * * * *